(12) United States Patent
Raszkowski (10) Patent No.: US 10,876,601 B2
(45) Date of Patent: Dec. 29, 2020

(54) METHOD OF ASSEMBLING A TRANSMISSION INCLUDING PLANETARY GEAR THRUST CONTAINMENT

(71) Applicant: Allison Transmission, Inc., Indianapolis, IN (US)

(72) Inventor: James Raszkowski, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 16/774,755

(22) Filed: Jan. 28, 2020

(65) Prior Publication Data
US 2020/0166104 A1    May 28, 2020

Related U.S. Application Data

(63) Continuation of application No. 15/692,664, filed on Aug. 31, 2017, now Pat. No. 10,619,710.

(51) Int. Cl.
*F16H 3/66*    (2006.01)

(52) U.S. Cl.
CPC .............. *F16H 3/666* (2013.01); *F16H 3/66* (2013.01); *F16H 2200/0065* (2013.01); *F16H 2200/2012* (2013.01); *F16H 2200/2041* (2013.01); *F16H 2200/2046* (2013.01)

(58) Field of Classification Search
CPC .................................. F16H 3/666; F16H 3/66
See application file for complete search history.

(56) References Cited

U.S. PATENT DOCUMENTS

| 3,941,013 A | 3/1976 | Miller |
| 4,395,925 A | 8/1983 | Gaus |
| 4,683,776 A | 8/1987 | Klemen |
| 5,503,604 A | 4/1996 | Pierce et al. |
| 5,954,613 A | 9/1999 | Park |
| 6,176,803 B1 | 1/2001 | Meyer et al. |
| 6,338,691 B1 | 1/2002 | Morrow |
| 7,014,589 B2 | 3/2006 | Stevenson |
| 7,226,381 B2 | 6/2007 | Klemen |

(Continued)

FOREIGN PATENT DOCUMENTS

JP    2015-137740 A    7/2015

OTHER PUBLICATIONS

Patent Cooperation Treaty, International Search Report and Written Opinion of the International Searching Authority, PCT/US2018/048255 to Allison Transmission, Inc., dated Dec. 17, 2018, 21 pages.

*Primary Examiner* — Derek D Knight
(74) *Attorney, Agent, or Firm* — Faegre Drinker Biddle & Reath LLP (57) ABSTRACT

A multi-speed transmission including a plurality of planetary gearsets and a plurality of selective couplers to achieve a plurality of different speed ratios is disclosed. The plurality of planetary gearsets may include a first planetary gearset, a second planetary gearset, a third planetary gearset, and a fourth planetary gearset received within a housing. The plurality of selective couplers may include a number of clutches and a number of brakes. A thrust load containment circuit is operably coupled to the plurality of planetary gearsets. The thrust load containment circuit includes a plurality of components arranged to resolve axial thrust loads from the plurality of planetary gearsets independent of the housing.

8 Claims, 7 Drawing Sheets

(56) References Cited

U.S. PATENT DOCUMENTS

| | | |
|---|---|---|
| 7,364,527 B2 | 4/2008 | Klemen |
| 9,425,841 B1 | 8/2016 | Salfelner |
| 9,625,007 B2 | 4/2017 | Long et al. |
| 10,619,710 B2 | 4/2020 | Raszkowski |
| 2004/0242366 A1 | 12/2004 | Tabata et al. |
| 2006/0223666 A1 | 10/2006 | Gumpoltsberger |
| 2011/0177908 A1 | 7/2011 | Wittkopp et al. |
| 2012/0083382 A1 | 4/2012 | Phillips et al. |
| 2016/0312861 A1 | 10/2016 | Foster et al. |
| 2019/0063559 A1 | 2/2019 | Raszkowski |

METHOD OF ASSEMBLING A TRANSMISSION INCLUDING PLANETARY GEAR THRUST CONTAINMENT

RELATED APPLICATION

The present application is a continuation of U.S. patent application Ser. No. 15/692,664, filed Aug. 31, 2017, titled TRANSMISSION INCLUDING PLANETARY GEAR THRUST CONTAINMENT, the entire disclosure of which is expressly incorporated by reference herein.

FIELD OF THE DISCLOSURE

The present disclosure relates to a multi-speed transmission and in particular to a multi-speed transmission including a plurality of planetary gearsets and thrust load containment for the planetary gearsets.

BACKGROUND OF THE DISCLOSURE

Multi-speed transmissions are known to use a plurality of planetary gearsets, selective couplers, interconnectors, and additional elements to achieve a plurality of forward and reverse speed ratios. Exemplary multi-speed transmissions are disclosed in US Published Patent Application Publication No. 2007/0072732, now U.S. Pat. No. 7,364,527, titled NINE SPEED AUTOMATIC TRANSMISSION WITH SIX TORQUE-TRANSMITTING MECHANISMS, and US Published Patent Application Publication No. 2016/0047440, now U.S. Pat. No. 9,625,007, titled MULTI-SPEED TRANSMISSION, the entire disclosures of which are expressly incorporated by reference herein.

It is known to provide multi-speed transmissions with planetary gearsets including cooperating helical gears that generate axial thrust loads when transmitting torque. Gear teeth having greater helix angles may reduce noise, but result in higher axial thrust loads. Such helical geared planetary transmissions typically resolve axial thrust loads through the transmission housings and adjacent cooperating components (e.g., thrust washers, ball bearings, etc.). As such, these load bearing components must be designed to support these thrust loads, thereby adding cost and complexity, while reducing reliability. Additionally, these transmission housings are typically formed of aluminum which requires additional axial clearance between the planetary gearsets due to differences in materials and associated thermal expansion coefficients.

SUMMARY

The present disclosure provides a multi-speed transmission including a plurality of planetary gearsets and a plurality of selective couplers to achieve at least nine forward speed ratios. The plurality of planetary gearsets may include a first planetary gearset, a second planetary gearset, a third planetary gearset, and a fourth planetary gearset. The plurality of selective couplers may include a number of clutches and a number of brakes. In one example, the present disclosure provides a multi-speed transmission having four planetary gearsets and six selective couplers. The six selective couplers may include two clutches and four brakes.

In some instances throughout this disclosure and in the claims, numeric terminology, such as first, second, third, and fourth, is used in reference to various gearsets, gears, gearset components, interconnectors, selective couplers, and other components. Such use is not intended to denote an ordering of the components. Rather, numeric terminology is used to assist the reader in identifying the component being referenced and should not be narrowly interpreted as providing a specific order of components. For example, a first planetary gearset identified in the drawings may support any one of the plurality of planetary gearsets recited in the claims, including the first planetary gearset, the second planetary gearset, the third planetary gearset, and the fourth planetary gearset, depending on the language of the claims.

According to an exemplary embodiment of the present disclosure, a transmission includes an input member, a plurality of planetary gearsets operably coupled to the input member, an output member operably coupled to the input member through the plurality of planetary gearsets, and a housing defining an interior. The plurality of planetary gearsets is positioned within the interior of the housing. A thrust load containment circuit is operably coupled to the plurality of planetary gearsets. The thrust load containment circuit includes a plurality of components arranged to resolve axial thrust loads from the plurality of planetary gearsets independent of the housing.

The plurality of planetary gearsets illustratively include first, second, third and fourth planetary gearsets including a plurality of gearset components having a sun gear, a plurality of planet gears operably coupled to the sun gear, a planet carrier operably coupled to the plurality of planet gears, and a ring gear operably coupled to the plurality of planet gears. Illustratively, a plurality of selective couplers is operably coupled to the plurality of planetary gearsets, each of the plurality of selective couplers having an engaged configuration and a disengaged configuration. The selective couplers include a first selective coupler, a second selective coupler, a third selective coupler, and a fourth selective coupler. The first selective coupler in the engaged configuration is configured to connect one of the gearset components of first planetary gearset with the housing, and the second selective coupler in the engaged configuration is configured to connect one of the gearset components of the second planetary gearset with the housing. A first interconnector fixedly couples the input member to the plurality of planetary gearsets through the sun gear of the first planetary gearset. A second interconnector fixedly couples the output member to the plurality of planetary gearsets through the planet carrier of the fourth planetary gearset. A third interconnector fixedly couples the ring gear of the first planetary gearset to the sun gear of the second planetary gearset.

Illustratively, the plurality of components of the thrust load containment circuit includes a central shaft extending axially between an input end and an output end, the input end of the central shaft being selectively coupled to the input member, and the output end of the central shaft being fixedly coupled to the sun gears of the third and fourth planetary gearsets. An input end thrust load containment member is operably coupled to the input end of the central shaft. An output end thrust load containment member is operably coupled to the output end of the central shaft. The plurality of planetary gearsets are positioned axially intermediate the input end thrust load containment member and the output end thrust load containment member, such that the thrust load containment members resolve axial thrust loads from the planetary gearsets transmitted to the central shaft.

According to a further illustrative embodiment of the present disclosure, a method of transmitting rotation from an input member to an output member includes the steps of rotating an input member, providing a housing having an interior, and providing a plurality of planetary gearsets within the interior of the housing. The illustrative method further includes the steps of rotating an output member through the plurality of planetary gearsets in response to rotation of the input member, the plurality of planetary gearsets having a plurality of configurations established with a plurality of selective couplers to provide a plurality of speed ratios between the input member and the output member, and establishing a first configuration of the plurality of planetary gearsets with the plurality of selective couplers to define a first speed ratio. The method further includes resolving axial thrust loads from the plurality of planetary gearsets independent of the housing.

According to another illustrative embodiment of the present disclosure, a method of transmitting rotation from an input member to an output member includes the steps of rotating an input member, transmitting rotation from the input member to a first planetary gearset, the first planetary gearset including a sun gear, a plurality of planet gears operably coupled to the sun gear, a planet carrier operably coupled to the plurality of planet gears, and a ring gear operably coupled to the plurality of planet gears, and generating a first axial thrust load between the sun gear and the ring gear of the first planetary gearset. The method further includes the steps of transmitting rotation from the first planetary gearset to a second planetary gearset, the second planetary gearset including a sun gear, a plurality of planet gears operably coupled to the sun gear, a planet carrier operably coupled to the plurality of planet gears, and a ring gear operably coupled to the plurality of planet gears, and generating a second axial thrust load between the sun gear and the ring gear of the second planetary gearset, wherein a net axial thrust load is defined by the difference between the second axial thrust load and the first axial thrust load. The method further includes the steps of providing an axially extending central shaft positioned radially inwardly from the first planetary gearset and the second planetary gearset, coupling an input end thrust load containment member on an input end of the central shaft, coupling an output end thrust load containment member on an output end of the central shaft, and containing, through the input end thrust load containment member and the output end thrust load containment member, the net axial thrust load from the planetary gearsets transmitted to the central shaft.

According to another exemplary embodiment of the present disclosure, a multi-speed transmission includes an input member, an output member, and a housing including an interior. The multi-speed transmission further includes a first planetary gearset, a second planetary gearset, a third planetary gearset, and a fourth planetary gearset received within the interior of the housing, each planetary gearset including a first gearset component, a second gearset component and a third gearset component. The input member is continuously connected with the first gearset component of the first planetary gearset. The output member is continuously connected to one of the gearset components of the fourth planetary gearset. A plurality of selective couplers are operably coupled to the plurality of planetary gearsets, each of the plurality of selective couplers having an engaged configuration and a disengaged configuration, the plurality of selective couplers including a first selective coupler, a second selective coupler, a third selective coupler, and a fourth selective coupler. The first selective coupler in the engaged configuration is configured to connect one of the gearset components of the first planetary gearset with the housing, and the second selective coupler in the engaged configuration is configured to connect one of the gearset components of the second planetary gearset with the housing. An axially extending central shaft is positioned radially inwardly from at least two of the planetary gearsets. An input end thrust load containment member is operably coupled to an input end of the central shaft, and an output end thrust load containment member is operably coupled to an output end of the central shaft. At least one of the planetary gearsets is positioned axially intermediate the input end thrust load containment member and the output end thrust load containment member, such that the thrust load containment members resolve axial thrust loads from the at least one planetary gearset transmitted to the central shaft.

According to yet another illustrative embodiment of the present disclosure, a method of assembling a transmission comprises the steps of providing a first planetary gearset including a sun gear, a plurality of planet gears operably coupled to the sun gear, a planet carrier operably coupled to the plurality of planet gears, and a ring gear operably coupled to the plurality of planet gears, providing a second planetary gearset including a sun gear, a plurality of planet gears operably coupled to the sun gear, a planet carrier operably coupled to the plurality of planet gears, and a ring gear operably coupled to the plurality of planet gears, and operably coupling the second planetary gearset with the first planetary gearset. The method further includes the steps of positioning the first planetary gearset and the second planetary gearset radially about a central shaft, the central shaft extending axially between an input end and an output end, fixing an input end thrust load containment member to the input end of the central shaft, and fixing an output end thrust load containment member to the output end of the central shaft, the plurality of planetary gearsets positioned axially intermediate the input end thrust load containment member and the output end thrust load containment member.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION

For the purposes of promoting an understanding of the principles of the present disclosure, reference is now made to the embodiment illustrated in the drawings, which is described below. The embodiment disclosed below is not intended to be exhaustive or limit the present disclosure to the precise form disclosed in the following detailed description. Rather, the embodiment is chosen and described so that others skilled in the art may utilize its teachings. Therefore, no limitation of the scope of the present disclosure is thereby intended. Corresponding reference characters indicate corresponding parts throughout the several views.

In the disclosed transmission embodiment, selective couplers are disclosed. A selective coupler is a device which may be actuated to fixedly couple two or more components together. A selective coupler fixedly couples two or more components to rotate together as a unit when the selective coupler is in an engaged configuration. Further, the two or more components may be rotatable relative to each other when the selective coupler is in a disengaged configuration. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A first exemplary selective coupler is a clutch. A clutch couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler is a brake. A brake couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in the above-incorporated US Published Patent Application No. 2016/0047440.

In addition to coupling through selective couplers, various components of the disclosed transmission embodiments may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

The disclosed illustrative transmission embodiments include a plurality of planetary gearsets. Each planetary gearset includes at least four components: a sun gear; a ring gear; a plurality of planet gears; and a carrier that is rotatably coupled to and carries the planet gears. In the case of a simple planetary gearset, the teeth of the sun gear are intermeshed with the teeth of the planet gears which are in turn intermeshed with the teeth of the ring gear. Each of these components may also be referred to as a gearset component. It will be apparent to one of skill in the art that some planetary gearsets may include further components than those explicitly identified. For example, one or more of the planetary gearsets may include two sets of planet gears. A first set of planet gears may intermesh with the sun gear while the second set of planet gears intermesh with the first set of planet gears and the ring gear. Both sets of planet gears are carried by the planet carrier.

One or more rotating components, such as shafts, drums, and other components, may be collectively referred to as an interconnector or an interconnecting member when the one or more components are fixedly coupled together. Interconnectors may further be fixedly coupled to one or more gearset components and/or one or more selective couplers.

An input member of the disclosed transmission embodiments is rotated by a prime mover. Exemplary prime movers include internal combustion engines, electric motors, hybrid power systems, and other suitable power systems. In one embodiment, the prime mover indirectly rotates the input member through a clutch and/or a torque converter. An output member of the disclosed transmission embodiments provides rotational power to one or more working components. Exemplary working components include one or more drive wheels of a motor vehicle, a power take-off shaft, and other suitable devices. The output member is rotated based on the interconnections of the gearset components and the selective couplers of the transmission. By changing the interconnections of the gearset components and the selective couplers, a rotation speed of the output member may be varied from a rotation speed of the input member.

The disclosed transmission embodiment is capable of transferring torque from the input member to the output member and rotating the output member in at least nine forward gear or speed ratios relative to the input member, and one reverse gear or speed ratio wherein the rotation direction of the output member is reversed relative to its rotation direction for the at least nine forward ratios. Exemplary gear ratios that may be obtained using the embodiments of the present disclosure are disclosed, for example, in the above-mentioned US Patent Application Publication No. 2007/0072732. Of course, other gear ratios are achievable depending on the characteristics of the gearsets utilized. Exemplary characteristics include respective gear diameters, the number of gear teeth, and the configurations of the various gears.

Figure 1:
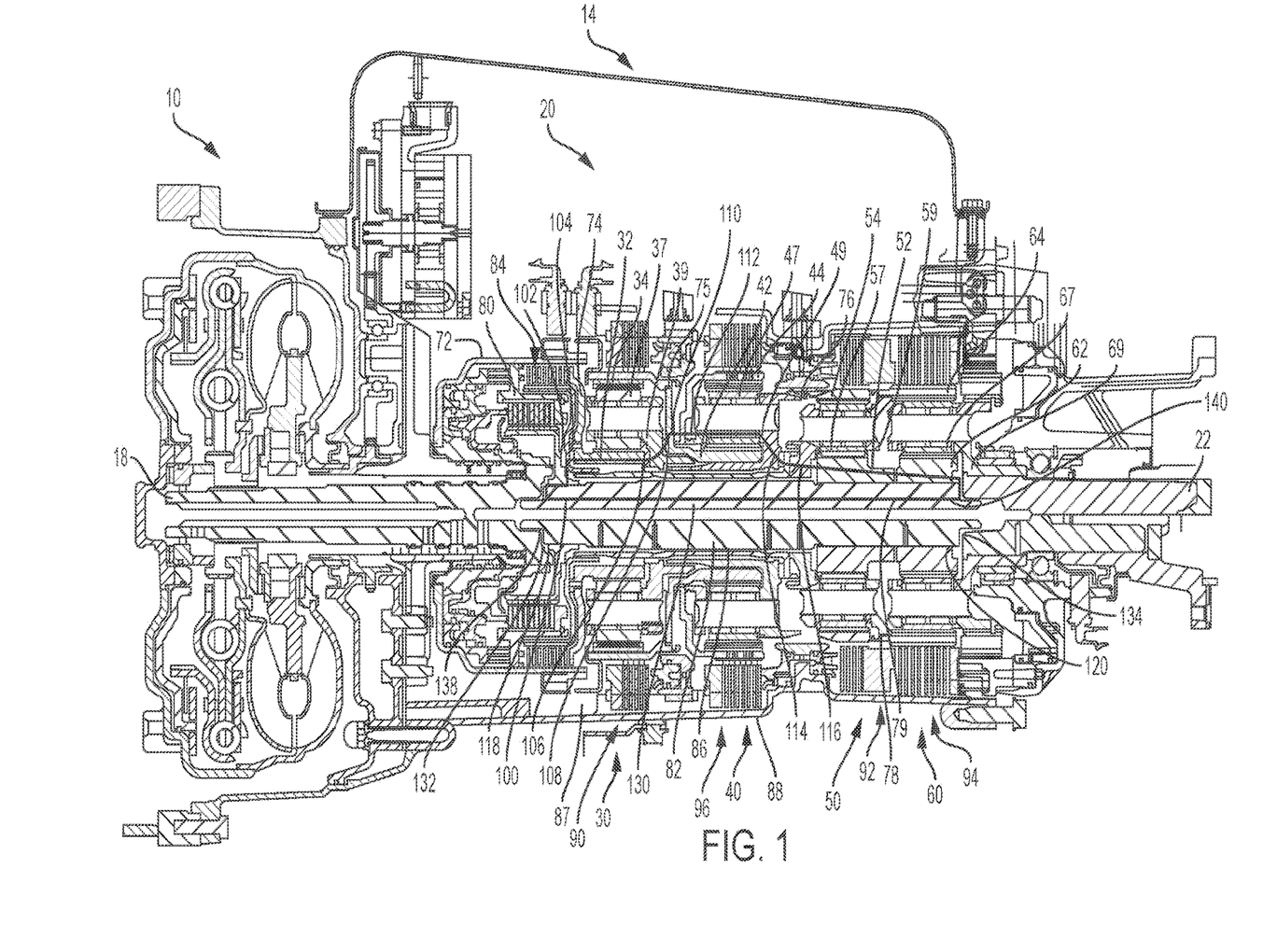
FIG. 1 is a cross-sectional view of an illustrative powertrain including a multi-speed transmission having a plurality of planetary gearsets and selective couplers.
Figure 2:
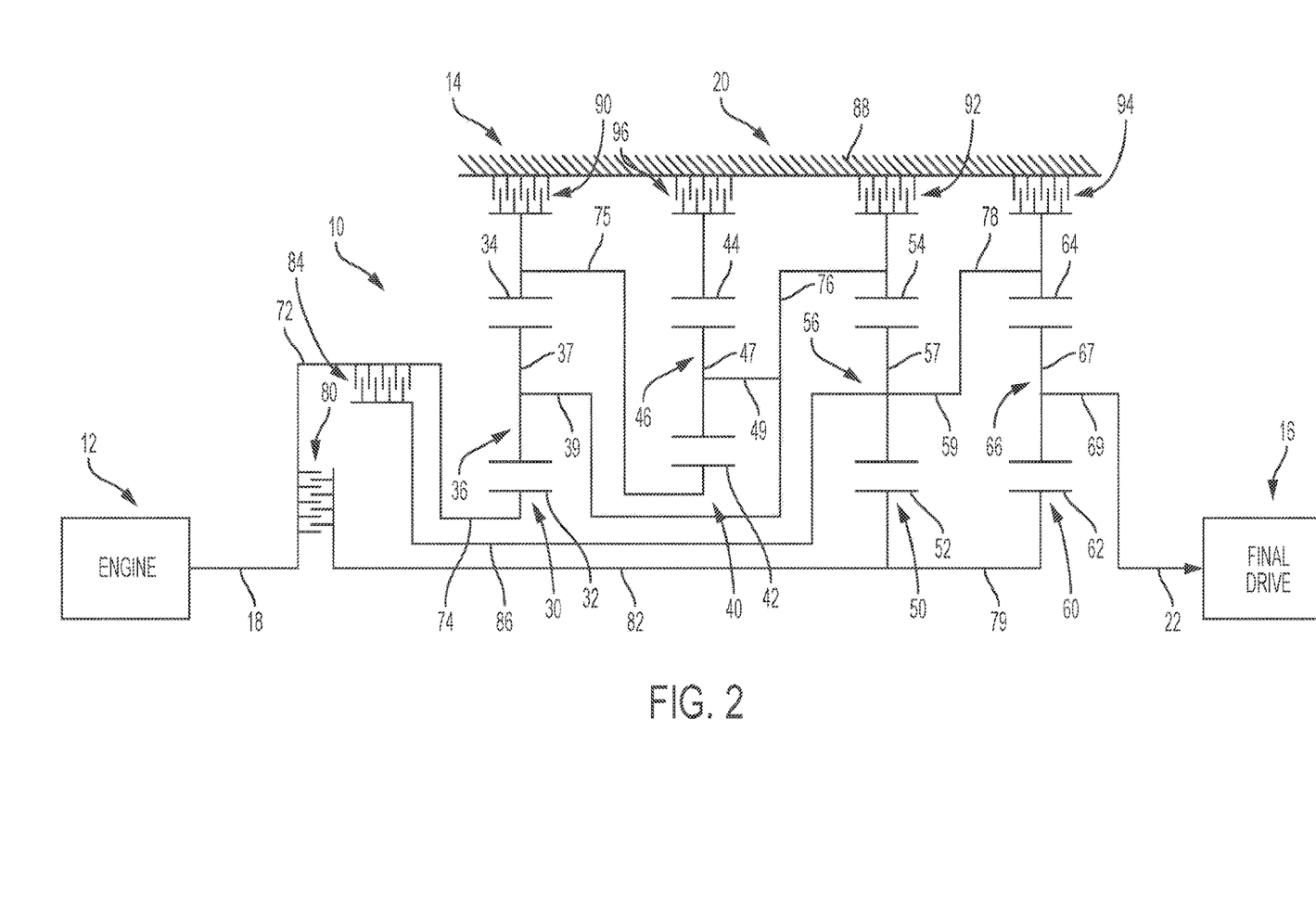
FIG. 2 is a schematic representation of the illustrative powertrain of FIG. 1.

Referring initially to FIGS. 1 and 2, an illustrative embodiment of a powertrain 10 is shown as including a conventional engine 12, a planetary transmission 14 and a conventional final drive mechanism 16. The illustrative planetary transmission 14 includes an input member or shaft 18 operably coupled with the engine 12, a planetary gear arrangement 20, and an output member or shaft 22 continuously connected with the final drive mechanism 16. The planetary gear arrangement 20 illustratively includes first, second, third and fourth planetary gearsets 30, 40, 50 and 60, respectively. For illustrative purposes, the planetary gearsets from left to right in FIGS. 1 and 2 are identified as first planetary gearset 30, second planetary gearset 40, third planetary gearset 50 and fourth planetary gearset 60. The planetary gear arrangement 20 is illustratively received within an interior 87 of a transmission housing 88. The transmission housing 88 is formed of a rigid material, illustratively aluminum.

The first planetary gearset 30 illustratively includes a plurality of cooperating gearset components, including a sun gear 32, a ring gear 34 and a planet carrier assembly 36. The planet carrier assembly 36 includes a plurality of pinion or planet gears 37 rotatably mounted on a carrier 39 and disposed in meshing relationship with both the sun gear 32 and the ring gear 34.

The second planetary gear set 40 illustratively includes a plurality of cooperating gearset components, including a sun gear 42, a ring gear 44, and a planet carrier assembly 46. The planet carrier assembly 46 includes a plurality of pinion or planet gears 47 rotatably mounted on a carrier 49 and disposed in meshing relationship with both the sun gear 42 and the ring gear 44.

The third planetary gearset 50 illustratively includes a plurality of cooperating gearset components, including a sun gear 52, a ring gear 54 and a planet carrier assembly 56. The planet carrier assembly 56 includes a plurality of pinion or planet gears 57 rotatably mounted on a carrier 59 and disposed in meshing relationship with both the sun gear 52 and the ring gear 54.

The fourth planetary gearset 60 illustratively includes a plurality of cooperating gearset components, including a sun gear 62, a ring gear 64, and a planet carrier assembly 66. The planet carrier assembly 66 includes a plurality of pinion or planet gears 67 rotatably mounted on a carrier 69 and disposed in meshing relationship with both the sun gear 62 and the ring gear 64.

In the illustrative embodiment, the input shaft 18 is continuously connected or fixedly coupled with the sun gear 32 of the first planetary gearset 30 via a first interconnector, illustratively a drum 72. In turn, a second interconnector, illustratively an intermediate shaft 74 is continuously connected or fixedly coupled to the drum 72. The output shaft 22 is continuously connected or fixedly coupled with the carrier 69 of the fourth planetary gearset 60. The ring gear 34 of the first planetary gearset 30 is continuously connected or fixedly coupled with the sun gear 42 of the second planetary gearset 40 through interconnector 75. The carrier 39 is continuously connected or fixedly coupled with the carrier 49 and with the ring gear 54 through interconnector 76. The carrier 59 is continuously connected or fixedly coupled with the ring gear 64 through interconnector 78. The sun gear 52 is continuously connected or fixedly coupled with the sun gear 62 through interconnector 79. The interconnectors 72, 74, 75, 76, 78 and 79 may each be formed of a single component or multiple components.

The sun gears 52 and 62 are selectively connectable with the input shaft 18 through a first selective coupler, illustratively a clutch 80, which selectively couples the input shaft 18 to a first intermediate shaft 82. The planet carrier 59 is configured to be selectively coupled with the input shaft 18 through a second selective coupler, illustratively a clutch 84, which connects the input shaft 18 to a second intermediate shaft 86. The ring gear 34 is configured to be selectively coupled with a stationary member, illustratively the transmission housing 88, through a third selective coupler, illustratively a brake 90. The ring gear 54 is configured to be selectively coupled with the transmission housing 88 through a fourth selective coupler, illustratively a brake 92. The ring gear 64 is configured to be selectively coupled with the transmission housing 88 through a fifth selective coupler, illustratively a brake 94. The ring gear 44 is configured to be selectively coupled with the transmission housing 80 through a sixth selective coupler, illustratively a brake 96.

In the illustrative embodiment, the selective couplers 80, 84, 90, 92, 94 and 96 may be selectively engaged in combinations of two to provide different configurations of planetary gear arrangement 20, such as nine forward speed ratios and a reverse speed ratio. In other illustrative embodiments, different numbers and combinations of couplers 80, 84, 90, 92, 94 and 96 may be selectively engaged to provide different configurations of planetary gear arrangement 20, and associated speed ratios. The selective couplers 80, 84, 90, 92, 94 and 96 are illustratively of the multiple disk-type, fluid actuated friction-drive establishing device which are commonly used in planetary gear transmissions. The selective couplers 80 and 84 are rotating type torque-transmitting couplers, commonly termed clutches, and the torque-transmitting couplers 90, 92, 94 and 96 are stationary type torque-transmitting couplers, commonly termed brakes or reaction clutches.

Illustratively, at least the sun gears 32, 42, 52, 62 and the ring gears 34, 44, 54, 64 are helical gears. The illustrative cooperating planet gears 37, 47, 57, 67 are also helical gears. The illustrative helical gears include teeth having a helix angle of at least 12 degrees and, illustratively of about 17 degrees. Such cooperating helical gears are configured to reduce noise, but typically result in higher axial thrust loads within the planetary gearsets 30, 40, 50, 60.

Figure 4A:
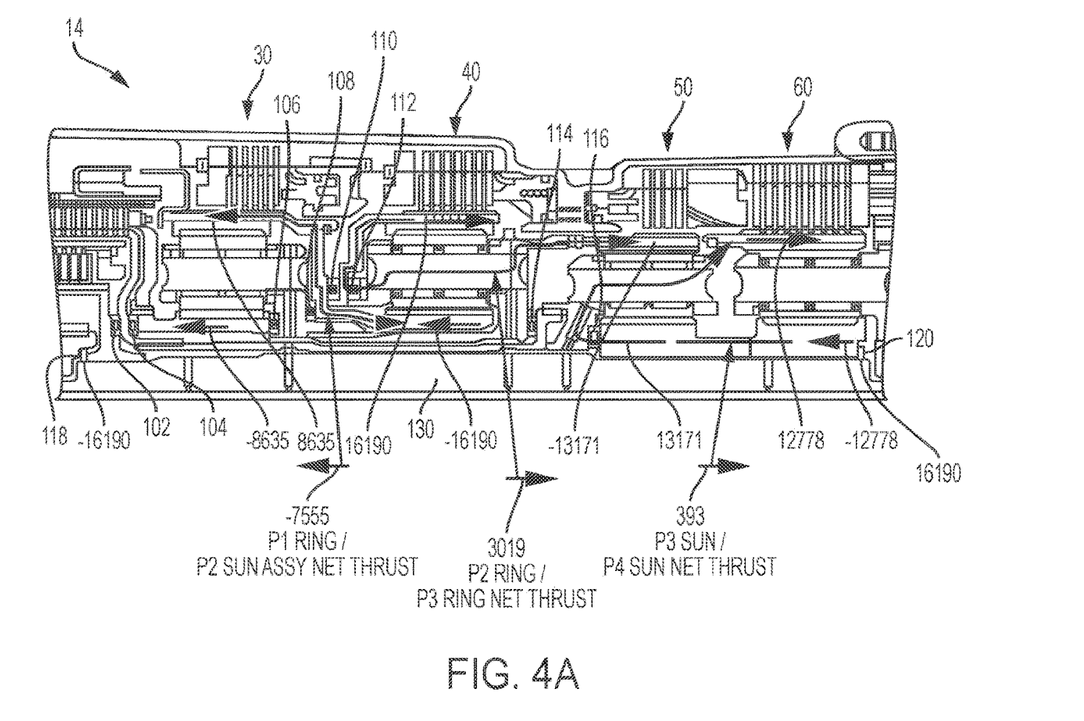
FIGS. 4A and 4B are diagrammatic cross-sectional views of thrust loads in the transmission of FIG. 1.
Figure 4B:
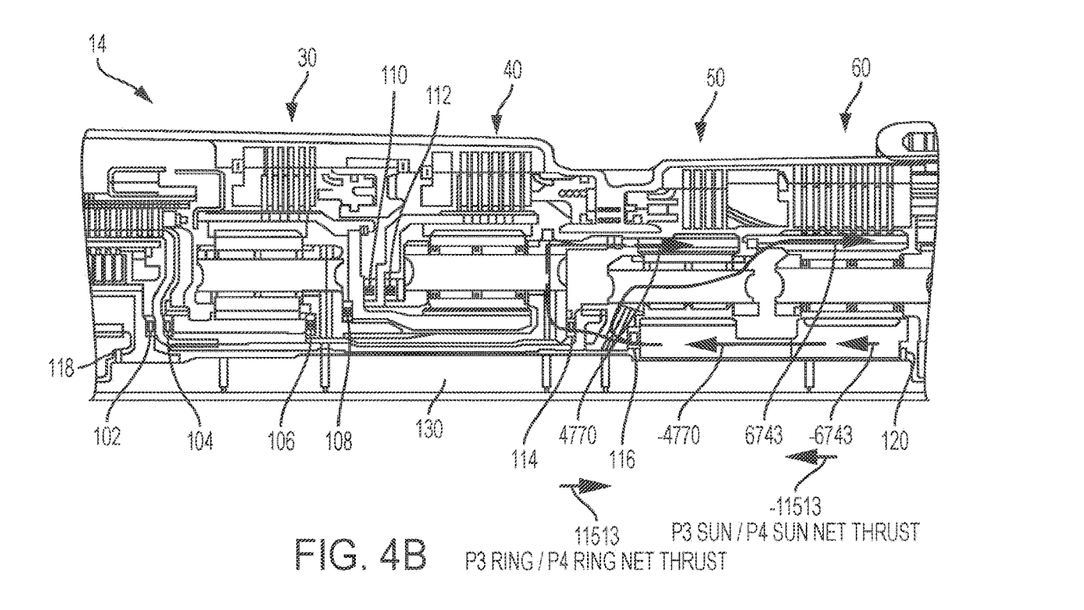

With reference to FIGS. 1, 4A and 4B, a thrust load containment circuit or thrust load path 100 is operably coupled to the planetary gearsets 30, 40, 50 and 60 and is defined by a plurality of thrust load containment members, illustratively thrust bearings 102, 104, 106, 108, 110, 112, 114 and 116, and retaining rings 118 and 120. First thrust bearing (T1) 102 and second thrust bearing (T2) 104 are disposed intermediate the clutches 80, 84 and the sun gear 32 of the first planetary gearset 30. Third thrust bearing (T3) 106 and fourth thrust bearing (T4) 108 are disposed intermediate the sun gear 32 and carrier 39 of the first planetary gearset 30, and the sun gear 42 and carrier 49 of the second planetary gearset 40. Fifth thrust bearing (T5) 110 and sixth thrust bearing (T6) 112 are positioned intermediate the sun gear 42 of the second planetary gearset 40, and the ring gear 44 and the carrier 49 of the second planetary gearset 40. Seventh thrust bearing (T7) 114 and eighth thrust bearing (T8) 116 are positioned intermediate the carrier 59 of the third planetary gearset 50, and the sun gear 52 and the carrier 59 of the third planetary gearset 50.

A main or central shaft 130 extends axially between an input end 132 and an output end 134. As may be appreciated, the central shaft 130 may be formed of a single component or multiple components. The input end 132 of the central shaft 130 is selectively coupled to the input member 18, and the output end 134 of the central shaft 130 is fixedly coupled to the sun gear 52 of the third planetary gearset 50 and the sun gear 62 of the fourth planetary gearset 60. Input end thrust load containment member or retaining ring (T9) 118 is operably coupled to the input end 132 of the central shaft 130. Output end thrust load containment member or retaining ring (T10) 120 is operably coupled to the output end 134 of the central shaft 130, the plurality of planetary gearsets 30, 40, 50, 60 are positioned axially intermediate the input end thrust load containment member 118 and the output end thrust load containment member 120. As such, the thrust load containment members 118 and 120 resolve axial thrust loads from the planetary gearsets 30, 40, 50, 60 transmitted to the central shaft 130. Illustratively, the thrust load containment members 118 and 120 are retaining rings secured within annular groves 138 and 140, respectively, of the central shaft 130. Alternatively, the thrust load containment member may be coupled to the central shaft 130 via other means, such as a threaded joint, a press fit, or an index locking mechanism similar to a bayonet fitting.

Figure 3A:
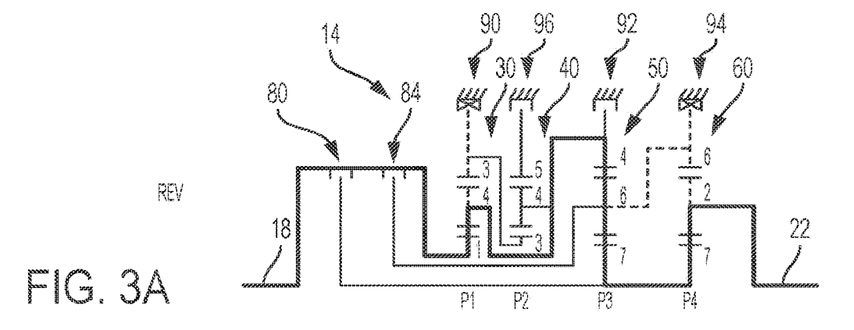
FIGS. 3A-3J are diagrammatic views of power flows from different selected configurations of the planetary gearsets in the transmission of FIG. 1.

Different selected configurations of the planetary gearsets 30, 40, 50, 60 in the illustrative transmission 14 result in different speed ratios. With reference to FIGS. 2 and 3A, a reverse speed ratio is established with the engagement of the brakes 90 and 94, thereby defining a reverse speed configuration of the planetary gear arrangement 20. The brake 90 connects the ring gear 34 with the transmission housing 88, and the brake 94 connects the ring gear 64 with the transmission housing 88. The sun gear member 32 rotates at the same speed as the input shaft 18. The carrier members 39 and 49 rotate at the same speed as the ring gear 54. The ring gear 34 and the sun gear 42 do not rotate. The carrier 39 rotates at a speed determined from the speed of the sun gear 32 and the ring gear/sun gear tooth ratio of the planetary gearset 30. The carrier 59 and the ring gear 64 do not rotate. The sun gear 52 rotates at the same speed as the sun gear 62. The sun gear 52 rotates at a speed determined from the speed of the ring gear 54 and the ring gear/sun gear tooth ratio of the planetary gearset 50. The carrier 69 rotates at the same speed as the output shaft 22. The carrier 69, and therefore the output shaft 22, rotates at a speed determined from the speed of the sun gear 62 and the ring gear/sun gear tooth ratio of the planetary gearset 60. The numerical value of the reverse speed ratio is determined utilizing the ring gear/sun gear tooth ratios of the planetary gearsets 30, 50 and 60. Application of the brake 90 to hold the ring gear 34 stationary (and the sun gear 42 stationary via the interconnecting member 75) causes the carrier 49 to rotate in the same direction as the input shaft 18. Assuming the following illustrative gear member tooth counts the speed ratio at the carrier 49 is +0.375: the sun gear 32 has 73 teeth, the pinion gear 37 has 26 teeth, the ring gear 34 has 125 teeth, the sun gear 42 has 57 teeth, the pinion gear 47 has 33 teeth, and the ring gear 44 has 123 teeth. In an illustrative embodiment, the reverse speed ratio between the input member 18 and the output member 22 of the planetary gear arrangement 20 is −5.61 (reverse direction).

Figure 3B:
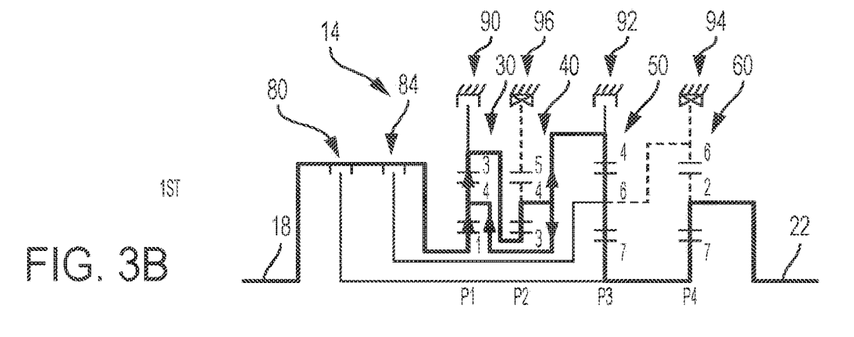

With reference to FIGS. 2 and 3B, a first forward speed ratio is established with the engagement of the brakes 94 and 96, thereby defining a first forward speed configuration of the planetary gear arrangement 20. The brake 94 connects the ring gear 64 with the transmission housing 88, and the brake 96 connects the ring gear 44 with the transmission housing 88. The sun gear 32 rotates at the same speed as the input shaft 18. The carrier 39 and the carrier 49 rotate at the same speed as the ring gear 54. The ring gear 34 rotates at the same speed as the sun gear 42. The ring gear 34 rotates at a speed determined from the speed of the carrier 39, the speed of the sun gear 32 and the ring gear/sun gear tooth ratio of the planetary gearset 30. The ring gear 44 does not rotate. The carrier 49 rotates at a speed determined from the speed of the sun gear 42 and the ring gear/sun gear tooth ratio of the planetary gearset 40. The carrier 59 and the ring gear 64 do not rotate. The sun gear 52 rotates at the same speed as the sun gear 62. The sun gear 52 rotates at a speed determined from the speed of the ring gear 54 and ring gear/sun gear tooth ratio of the planetary gearset 50. The carrier 69 rotates at the same speed as the output shaft 22. The carrier 69, and therefore the output shaft 22, rotates at a speed determined from the speed of the sun gear 62 and the ring gear/sun gear tooth ratio of the planetary gearset 60. The numerical value of the first forward speed ratio is determined utilizing the ring gear/sun gear tooth ratios of the planetary gearsets 30, 40, 50 and 60.

The sun gear 32 rotates in the same direction as the input shaft 18 while the carrier 39 and the ring gear 34 rotate in an opposite direction. Because the carrier member 39 is continuously connected to the carrier 49 by the interconnecting member 76, the carrier 49 also rotates in an opposite direction than the input member 18. With the tooth ratios described above, the speed ratio of the carrier 49 is −0.375. Thus, the speed ratio achieved of the carrier 49 is equal in magnitude but opposite in direction in the first forward speed ratio as compared to the reverse speed ratio. In an illustrative embodiment, the first forward speed ratio between the input member 18 and the output member 22 of the planetary gear arrangement 20 is 5.58.

Figure 3C:
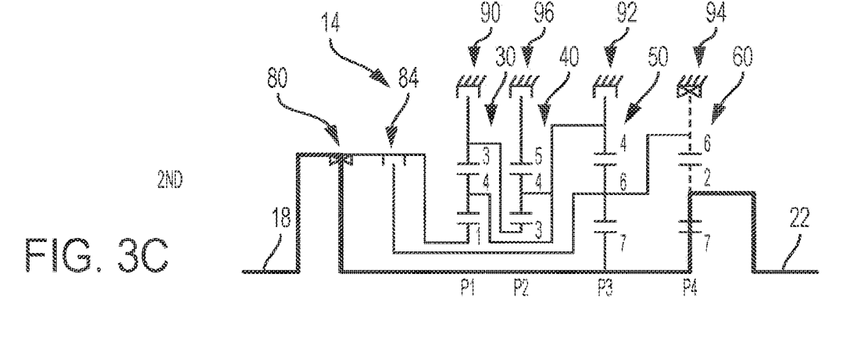

With reference to FIGS. 2 and 3C, a second forward speed ratio is established with the engagement of the clutch 80 and the brake 94, thereby defining a second forward speed configuration of the planetary gear arrangement 20. The clutch 80 connects the input member 18 with the sun gears 52 and 62, and the brake 94 connects the ring gear 64 with the transmission housing 88. The sun gears 32, 52 and 62 rotate at the same speed as the input shaft 18. The carriers 39 and 49 rotate at the same speed as the ring gear 54. The ring gear 34 rotates at the same speed as the sun gear 42. The ring gear 34 rotates at a speed determined from the speed of the carrier 39, the speed of the sun gear 32 and the ring gear/sun gear tooth ratio of the planetary gearset 30. The carrier 59 and the ring gear 64 do not rotate. The ring gear 54 rotates at a speed determined from the speed of the sun gear 52 and the ring gear/sun gear tooth ratio of the planetary gearset 50. The carrier 69 rotates at the same speed as the output shaft 22. The carrier 69, and therefore the output shaft 22, rotates at a speed determined from the speed of the sun gear 62 and the ring gear/sun gear tooth ratio of the planetary gearset 60. The numerical value of the second forward speed ratio is determined utilizing the ring gear/sun gear tooth ratios of the planetary gearset 60. In an illustrative embodiment, the second forward speed ratio between the input member 18 and the output member 22 of the planetary gear arrangement 20 is 3.51.

Figure 3D:
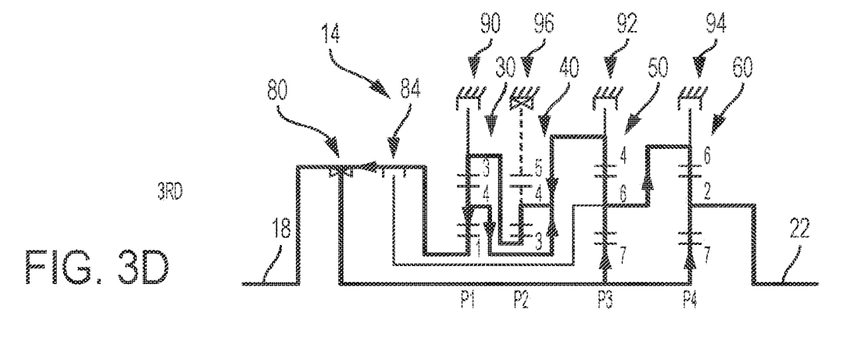

With reference to FIGS. 2 and 3D, a third forward speed ratio is established with the engagement of the clutch 80 and the brake 96, thereby defining a third forward speed configuration of the planetary gear arrangement 20. The clutch 80 connects the input shaft 18 with the sun gears 52 and 62. The brake 96 connects the ring gear 44 with the transmission housing 88. The sun gears 32, 52, and 62 rotate at the same speed as the input member 18. The carrier 39 and the carrier 49 rotate at the same speed as the ring gear 54. The ring gear 34 rotates at the same speed as the sun gear 42. The ring gear 34 rotates at a speed determined from the speed of the carrier 39, the speed of the sun gear 32 and the ring gear/sun gear tooth ratio of the planetary gearset 30. The ring gear 44 does not rotate. The carrier 49 rotates at a speed determined from the speed of the sun gear 42 and the ring gear/sun gear tooth ratio of the planetary gearset 40. The carrier 59 rotates at the same speed as the ring gear 64. The carrier 59 rotates at a speed determined from the speed of the ring gear 54, the speed of the sun gear 52 and the ring gear/sun gear tooth ratio of the planetary gearset 50. The carrier 69 rotates at the speed as the output shaft 22. The carrier 69, and therefore the output shaft 22, rotates at a speed determined from the speed of the ring gear 64, the speed of the sun gear 62 and the ring gear/sun gear tooth ratio of the planetary gearset 60. The numerical value of the third forward speed ratio is determined utilizing the ring gear/sun gear tooth ratios of the planetary gearsets 30, 40, 50 and 60. In an illustrative embodiment, the third forward speed ratio between the input member 18 and the output member 22 of the planetary gear arrangement 20 is 2.61.

Figure 3E:
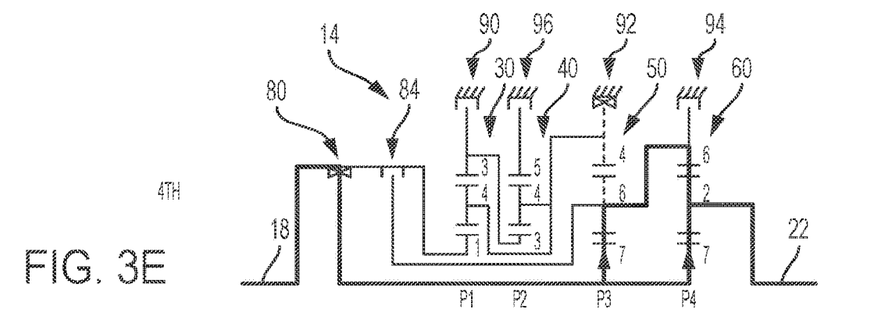

With reference to FIGS. 2 and 3E, a fourth forward speed ratio is established with the engagement of the clutch 80 and the brake 92, thereby defining a fourth forward speed configuration of the planetary gear arrangement 20. The clutch 80 connects the input shaft 18 with the sun gear 52 (and sun gear 62 via the interconnecting member 79). The brake 92 connects the ring gear 54 with the transmission housing 88. The sun gears 32, 52 and 62 rotate at the same speed as the input shaft 18. The carriers 39 and 49 and the ring gear 54 do not rotate. The ring gear 34 rotates at the same speed as the sun gear 42. The ring gear 34 rotates at a speed determined from the speed of the sun gear 32 and the ring gear/sun gear tooth ratio of the planetary gearset 30. The carrier 59 rotates at the same speed as the ring gear 64. The carrier 59 rotates at a speed determined from the speed of the sun gear 52 and the ring gear/sun gear tooth ratio of the planetary gearset 50. The carrier 69 rotates at the same speed as the output shaft 22. The carrier 69, and therefore the output shaft 22, rotates at a speed determined from the speed of the ring gear 64, the speed of the sun gear 62 and the ring gear/sun gear tooth ratio of the planetary gearset 60. The numerical value of the fourth forward speed ratio is determined utilizing the ring gear/sun gear tooth ratios of the planetary gearsets 50 and 60. In an illustrative embodiment, the fourth forward speed ratio between the input member 18 and the output member 22 of the planetary gear arrangement 20 is 1.82.

Figure 3F:
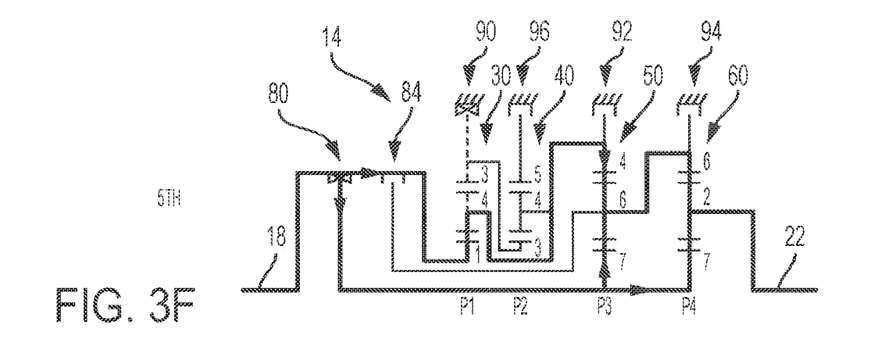

With reference to FIGS. 2 and 3F, a fifth forward speed ratio is established with the engagement of the clutch 80 and the brake 90, thereby defining a fifth forward speed configuration of the planetary gear arrangement 20. The clutch 80 connects the input shaft 18 with the sun gears 52 (and sun gear 62 via the interconnecting member 79), and the brake 90 connects the ring gear 34 with the transmission housing 88. The sun gears 32, 52 and 62 rotate at the same speed as the input shaft 18. The carriers 39 and 49 rotate at the same speed as the ring gear 54. The ring gear 34 and the sun gear 42 do not rotate. The carrier 39 rotates at a speed determined from the speed of the sun gear 32 and the ring gear/sun gear tooth ratio of the planetary gearset 30. The carrier 59 rotates at the same speed as the ring gear 64. The carrier 59 rotates at a speed determined from the speed of the ring gear 54, the speed of the sun gear 52 and the ring gear/sun gear tooth ratio of the planetary gearset 50. The carrier 69 rotates at the same speed as the output shaft 22. The carrier 69, and therefore the output shaft 22, rotates at a speed determined from the speed of the ring gear 64, the speed of the sun gear 62 and the ring gear/sun gear tooth ratio of the planetary gearset 60. The numerical value of the fifth forward speed ratio is determined utilizing the ring gear/sun gear tooth ratios of the planetary gearsets 30, 50 and 60. In an illustrative embodiment, the fifth forward speed ratio between the input member 18 and the output member 22 of the planetary gear arrangement 20 is 1.40.

Figure 3G:
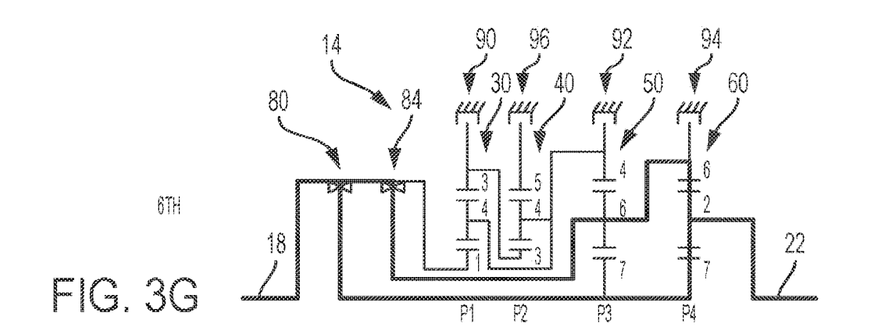

With reference to FIGS. 2 and 3G, a sixth forward speed ratio is established with the engagement of the clutches 80 and 84, thereby defining a sixth forward speed configuration of the planetary gear arrangement 20. The clutch 80 connects the input shaft 18 with the sun gears 52 and 62. The clutch 84 connects the input shaft 18 with the carrier member 59. In this configuration, the sun gears 32, 52 and 62 as well as the carrier 59 and the ring gear 64 rotate at the same speed as the input shaft 18. Because the ring gear 64 and the sun gear 62 rotate at the speed of the input shaft 18, the carrier 69, and therefore the output shaft 22, also rotate at the same speed as the input shaft 18. Accordingly, in this configuration, the input shaft 18 and the output shaft 22 rotate at the same speed, and the numerical value of the sixth forward speed ratio is 1. In an illustrative embodiment, the sixth forward speed ratio between the input member 18 and the output member 22 of the planetary gear arrangement 20 is 1.00.

Figure 3H:
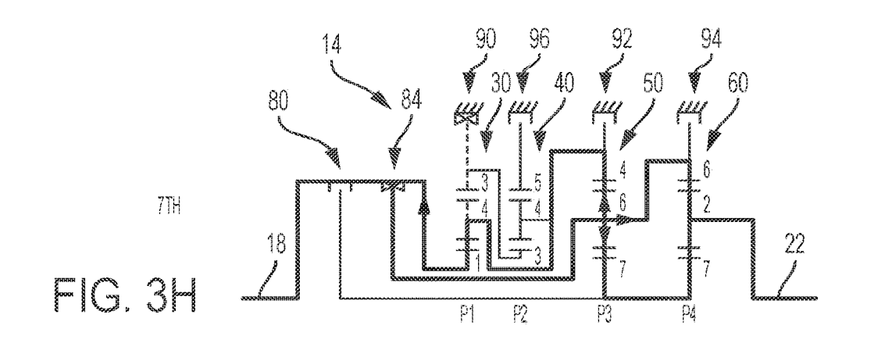

With reference to FIGS. 2 and 3H, a seventh forward speed ratio is established with the engagement of the clutch 84 and the brake 90, thereby defining a seventh forward speed configuration of the planetary gear arrangement 20. The clutch 84 connects the input shaft 18 with the carrier 59, and the brake 90 connects the ring gear 34 with the transmission housing 88. The sun gear 32, the carrier 59, and the ring gear member 64 rotate at the same speed as the input member 18. The carrier 39 and the carrier 49 rotate at the same speed as the ring gear 54. The ring gear 34 and the sun gear 42 do not rotate. The carrier 39 rotates at a speed determined from the speed of the sun gear 32 and the ring gear/sun gear tooth ratio of the planetary gearset 30. The sun gear 52 rotates at the same speed as the sun gear 62. The sun gear 52 rotates at a speed determined from the speed of the ring gear 54, the speed of the carrier 59 and the ring gear/sun gear tooth ratio of the planetary gearset 50. The carrier 69 rotates at the same speed as the output shaft 22. The carrier 69, and therefore the output shaft 22, rotates at a speed determined from the speed of the ring gear 64, the speed of the sun gear 62 and the ring gear/sun gear tooth ratio of the planetary gearset 60. The numerical value of the seventh forward speed ratio is determined utilizing the ring gear/sun gear tooth ratios of the planetary gearsets 30, 50 and 60. In an illustrative embodiment, the seventh forward speed ratio between the input member 18 and the output member 22 of the planetary gear arrangement 20 is 0.77.

Figure 3I:
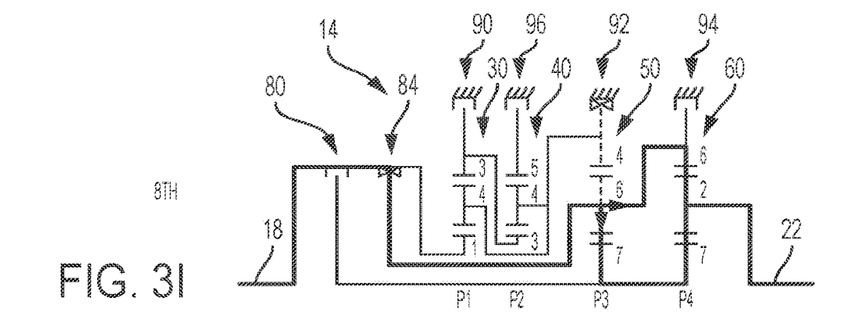

With reference to FIGS. 2 and 3I, an eighth forward speed ratio is established with the engagement of the clutch 84 and the brake 92, thereby defining an eighth forward speed configuration of the planetary gear arrangement 20. The clutch 84 connects the input shaft 18 with the carrier 59, and the brake 92 connects the ring gear 54 with the transmission housing 88. The sun gear 32, the carrier 59 and the ring gear 64 rotate at the same speed as the input shaft 18. The carriers 39, 49 and the ring gear 54 do not rotate. The ring gear 34 rotates at the same speed as the sun gear 32. The ring gear 34 rotates at a speed determined from the speed of the sun gear 32, the speed of the carrier 39, and the ring gear/sun gear tooth ratio of the planetary gearset 30. The sun gear 52 rotates at the same speed as the sun gear 62. The sun gear 52 rotates at a speed determined from the speed of the carrier 59 and the ring gear/sun gear tooth ratio of the planetary gearset 50. The carrier 69 rotates at the same speed as the output shaft 22. The carrier 69, and therefore the output shaft 22, rotates at a speed determined from the speed ring gear 64, the speed of the sun gear 62 and the ring gear/sun gear tooth ratio of the planetary gearset 60. The numerical value of the eighth forward speed ratio is determined utilizing the ring gear/sun gear tooth ratios of the planetary gearsets 50 and 60. In an illustrative embodiment, the eighth forward speed ratio between the input member 18 and the output member 22 of the planetary gear arrangement 20 is 0.67.

Figure 3J:
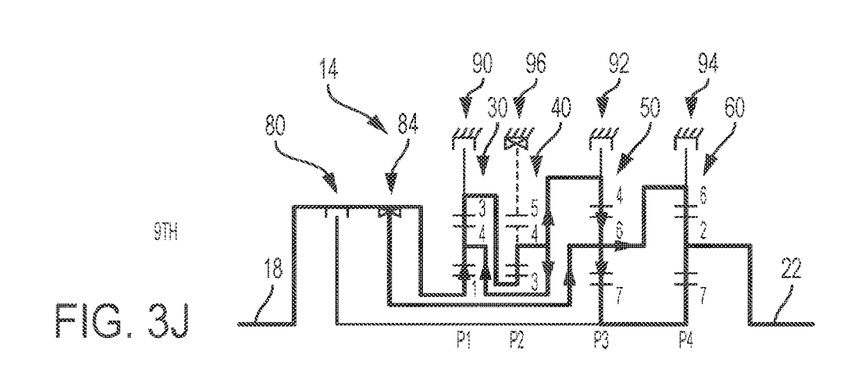

With reference to FIGS. 2 and 3J, a ninth forward speed ratio is established with the engagement of the clutch 84 and the brake 96, thereby defining a ninth forward speed configuration of the planetary gear arrangement 20. The clutch 84 connects the input shaft 18 with the carrier 59 and the brake 96 connects the ring gear 44 with the transmission housing 88. The sun gear 32, the carrier 59 and the ring gear 64 rotate at the same speed as the input shaft 18. The carriers 39 and 49 rotate at the same speed as the ring gear 54. The ring gear 34 rotates at the same speed as the sun gear 42. The ring gear 34 rotates at a speed determined from the speed of the carrier 39, the speed of the sun gear 32 and the ring gear/sun gear tooth ratio of the planetary gearset 30. The carrier 49 rotates at a speed determined from the speed of the sun gear 42 and the ring gear/sun gear tooth ratio of the planetary gearset 40. The sun gear 52 rotates at the same speed as the sun gear 62. The sun gear 52 rotates at a speed determined from the speed of the ring gear 54, the speed of the carrier 59 and the ring gear/sun gear tooth ratio of the planetary gearset 50. The carrier 69 rotates at the same speed as the output shaft 22. The carrier 69, and therefore the output shaft 22, rotates at a speed determined from the speed of the ring gear 64, the speed of the sun gear 62 and the ring gear/sun gear tooth ratio of the planetary gearset 60. The numerical value of the ninth forward speed ratio is determined utilizing the ring gear/sun gear tooth ratios of the planetary gearsets 30, 40, 50 and 60. In an illustrative embodiment, the ninth forward speed ratio between the input member 18 and the output member 22 of the planetary gear arrangement 20 is 0.60.

FIGS. 4A and 4B are diagrammatic cross-sectional views of thrust loads in the planetary transmission 14 of FIG. 1 with the planetary gear arrangement 20 in the first forward speed configuration and the fourth forward speed configuration, respectively.

With reference to FIG. 4A, illustrative axial thrusts within the planetary gearsets 30, 40, 50 and 60 in the first forward configuration (i.e., first forward speed ratio) are shown in the below Table I. Within the first planetary gearset 30, the sun gear 32 thrust is −8635 Newton (N) and the ring gear 34 thrust is 8635 Newton (N). Within the second planetary gearset 40, the sun gear 42 thrust is −16190 Newton (N) and the ring gear 44 thrust is 16190 Newton (N). Within the third planetary gearset 50, the sun gear 52 thrust is 13171 Newton (N) and the ring gear 54 thrust is −13171 Newton (N). Within the fourth planetary gearset 60, the sun gear 62 thrust is −12778 Newton (N) and the ring gear 64 thrust is 12778 Newton (N).

TABLE I

Axial Thrust Loads in First Forward Configuration

| PLANETARY GEARSET | SUN GEAR AXIAL THRUST (N) | RING GEAR AXIAL THRUST (N) |
| --- | --- | --- |
| 30 | −8635 | 8635 |
| 40 | −16190 | 16190 |
| 50 | 13171 | −13171 |
| 60 | −12778 | 12778 |

Illustrative net axial thrust loads resulting from the axial thrusts of Table I are provided below in Table II.

TABLE II

Thrust Loads in First Forward Configuration

| THRUST CONTAINMENT MEMBER | AXIAL THRUST (N) |
| --- | --- |
| T1 | 16190 |
| T2 | 16190 |
| T3 | 7555 |
| T4 | 7555 |
| T5 | 0 |
| T6 | 16190 |
| T7 | 3019 |
| T8 | 15797 |
| T9 | 16190 |
| T10 | 16190 |

With reference to FIG. 4B, illustrative axial thrusts within the planetary gearsets 30, 40, 50 and 60 in the fourth forward configuration (i.e., fourth forward speed ratio) are shown in the below Table III. Within the first and secondary planetary gearsets 30 and 40, there are no axial thrust loads on the respective sun gears 32 and 42, and the ring gears 34 and 44. Within the third planetary gearset 50, the sun gear 52 thrust is −4770 Newton (N) and the ring gear 54 thrust is 4770 Newton (N). Within the fourth planetary gearset 60, the sun gear 62 thrust is −6743 Newton (N) and the ring gear 64 thrust is 6743 Newton (N).

TABLE III

Axial Thrust Loads in Fourth Forward Configuration

| PLANETARY GEARSET | SUN GEAR AXIAL THRUST (N) | RING GEAR AXIAL THRUST (N) |
| --- | --- | --- |
| 30 | 0 | 0 |
| 40 | 0 | 0 |
| 50 | −4770 | 4770 |
| 60 | −6743 | 6743 |

Illustrative net axial thrust loads resulting from the axial thrusts of Table III are provided below in Table IV.

TABLE IV

Thrust Loads in Fourth Forward Configuration

| THRUST CONTAINMENT MEMBER | AXIAL THRUST (N) |
| --- | --- |
| T1 | 0 |
| T2 | 0 |
| T3 | 0 |
| T4 | 0 |
| T5 | 0 |
| T6 | 0 |
| T7 | 4770 |
| T8 | 11513 |
| T9 | 0 |
| T10 | 0 |

Figure 5:
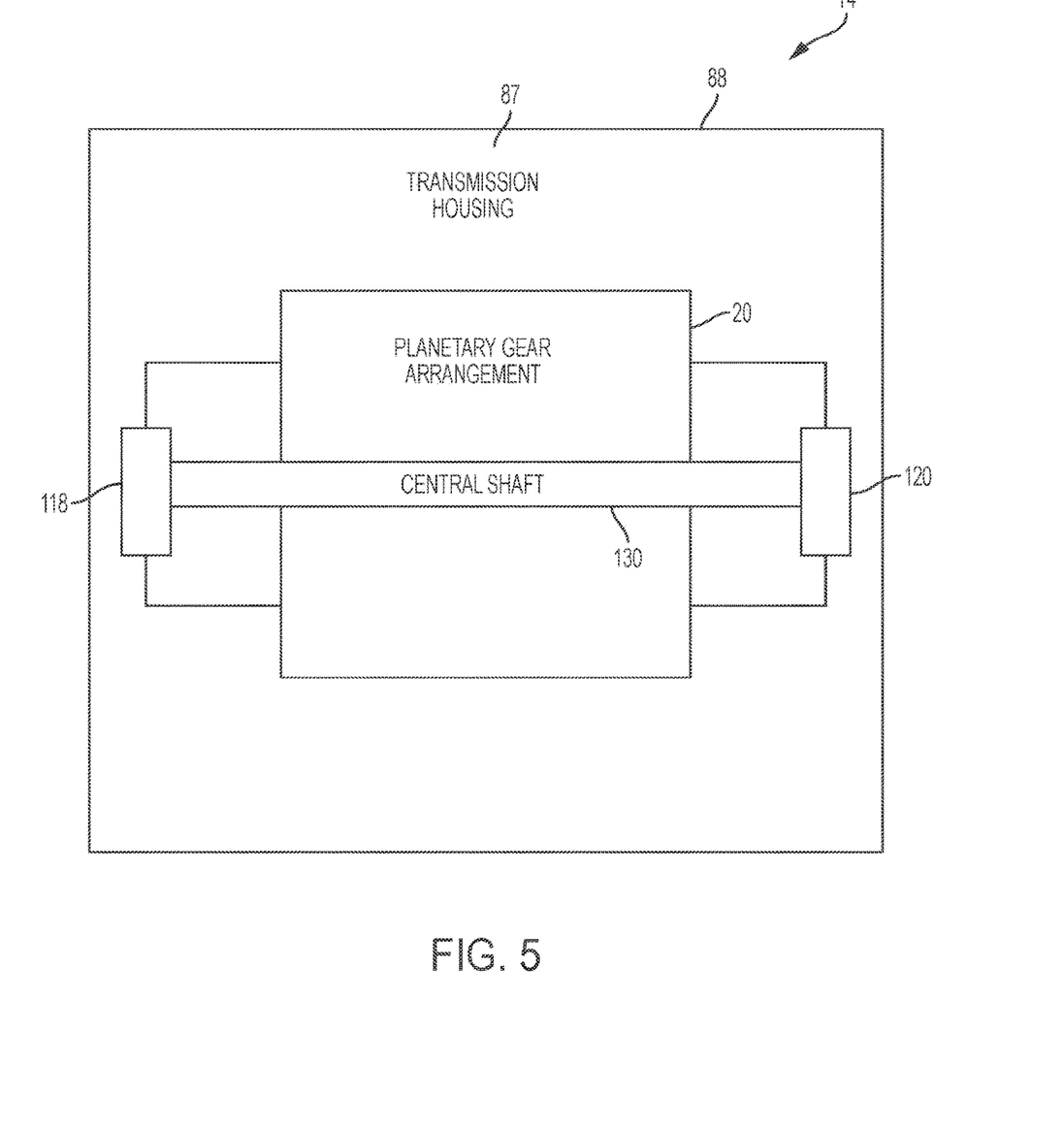
FIG. 5 is a diagrammatic representation of functional elements of the transmission of FIG. 1.

FIG. 5 is a diagrammatic representation of functional elements of the planetary transmission 14 of FIG. 1. The housing 88 is shown in spaced relation to, and illustratively radially outwardly from, the planetary gear arrangement 20 and the central shaft 130. As detailed above, the thrust load containment circuit 100 is configured to resolve axial thrust loads from the plurality of planetary gearsets 30, 40, 50 and 60 independent of the housing 88. More particularly, the axial thrust loads from the planetary gearsets 30, 40, 50 and 60 are absorbed by the thrust load containment members 118 and 120 coupled to the central shaft 130.

An illustrative method of assembling the planetary transmission 14 includes the steps of providing first planetary gearset 30 including sun gear 32, plurality of planet gears 37 operably coupled to the sun gear 32, planet carrier 39 operably coupled to the plurality of planet gears 37, and ring gear 34 operably coupled to the plurality of planet gears 37, providing a second planetary gearset 40 including sun gear 42, plurality of planet gears 47 operably coupled to the sun gear 42, planet carrier 49 operably coupled to the plurality of planet gears 47, and ring gear 44 operably coupled to the plurality of planet gears 47, and operably coupling the second planetary gearset 40 with the first planetary gearset 30.

The illustrative method further includes providing third planetary gearset 50 including sun gear 52, plurality of planet gears 57 operably coupled to the sun gear 52, planet carrier 59 operably coupled to the plurality of planet gears 57, and ring gear 54 operably coupled to the plurality of planet gears 57, and providing fourth planetary gearset 60 including sun gear 62, plurality of planet gears 67 operably coupled to the sun gear 62, planet carrier 69 operably coupled to the plurality of planet gears 67, and ring gear 64 operably coupled to the plurality of planet gears 67. The illustrative method further includes operably coupling the third planetary gearset 50 with the second planetary gearset 40, and operably coupling the fourth planetary gearset 60 with the third planetary gearset 50. The method continues with positioning the first planetary gearset 30, the second planetary gearset 40, the third planetary gearset 50, and the fourth planetary gearset 60 radially outwardly from (or around) the central shaft 130.

The method further includes fixing the input end thrust load containment member 118 to the input end 132 of the central shaft 130, and fixing the output end thrust load containment member 120 to the output end 134 of the central shaft 130, the plurality of planetary gearsets 30, 40, 50 and 60 positioned axially intermediate the input end thrust load containment member 118 and the output end thrust load containment member 120. Illustratively, the plurality of planetary gearsets 30, 40, 50 and 60 are positioned within the housing 88.

The method further includes providing a plurality of selective couplers 80, 84, 90, 92, 94 and 96 operably coupled to the plurality of planetary gearsets 30, 40, 50 and 60, each of the plurality of selective couplers having an engaged configuration and a disengaged configuration. The plurality of selective couplers 80, 84, 90, 92, 94 and 96 include first selective coupler 90 and second selective coupler 96, the first selective coupler 90 in the engaged configuration being configured to connect one of the gearset components of the first planetary gearset 30 with the housing 88, and the second selective coupler 96 in the engaged configuration being configured to connect one of the gearset components of the second planetary gearset 40 with the housing 88.

The planetary transmission 14 of the present disclosure provides for a thrust load containment circuit or load path that is configured to resolve axial thrust loads from the planetary gearsets 30, 40, 50, 60 independent from the housing 88. Such axial thrust loads are illustratively absorbed by a central shaft 130 through thrust load containment members 118 and 120, thereby relieving the housing 88 from such forces. Additionally, the planetary transmission 14 avoids complex arrangements of thrust washers, thrust bearings, ball bearings and transmission housings in prior art transmissions which are required to support axial thrust loads and result in added costs and potential reduced reliability.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of assembling a transmission comprising the steps of:
   providing a plurality of planetary gearsets, the plurality of planetary gearsets including
      a first planetary gearset including a plurality of gearset components, the gearset components including a sun gear, a plurality of planet gears operably coupled to the sun gear, a planet carrier operably coupled to the plurality of planet gears, and a ring gear operably coupled to the plurality of planet gears; and
      a second planetary gearset including a plurality of gearset components, the gearset components including a sun gear, a plurality of planet gears operably coupled to the sun gear, a planet carrier operably coupled to the plurality of planet gears, and a ring gear operably coupled to the plurality of planet gears;
   operably coupling the second planetary gearset with the first planetary gearset;
   positioning the first planetary gearset and the second planetary gearset radially outwardly from a central shaft, the central shaft extending axially between an input end and an output end;
   fixing an input end thrust load containment member to the input end of the central shaft; and
   fixing an output end thrust load containment member to the output end of the central shaft, the plurality of planetary gearsets positioned axially intermediate the input end thrust load containment member and the output end thrust load containment member.

2. The method of claim 1, further comprising the steps of:
   providing a third planetary gearset including a sun gear, a plurality of planet gears operably coupled to the sun gear, a planet carrier operably coupled to the plurality of planet gears, and a ring gear operably coupled to the plurality of planet gears;
   providing a fourth planetary gearset including a sun gear, a plurality of planet gears operably coupled to the sun gear, a planet carrier operably coupled to the plurality of planet gears, and a ring gear operably coupled to the plurality of planet gears;
   operably coupling the third planetary gearset with the second planetary gearset;
   operably coupling the fourth planetary gearset with the third planetary gearset; and
   positioning the first planetary gearset, the second planetary gearset, the third planetary gearset, and the fourth planetary gearset radially outwardly from the central shaft.

3. The method of claim 1, further comprising the steps of:
   providing a housing including an interior; and
   positioning the first planetary gearset, the second planetary gearset, the third planetary gearset, and the fourth planetary gearset within the interior of the housing.

4. The method of claim 3, further comprising the step of providing a plurality of selective couplers, each of the plurality of selective couplers having an engaged configuration and a disengaged configuration, the plurality of selective couplers including a first selective coupler and a second selective coupler, the first selective coupler in the engaged configuration being configured to connect one of the gearset components of the first planetary gearset with the housing.

5. The method of claim 4, wherein the second selective coupler in the engaged configuration being configured to connect one of the gearset components of the second planetary gearset with the housing.

6. The method of claim 1, further comprising the steps of:
   providing a housing including an interior; and
   positioning the first planetary gearset and the second planetary gearset within the interior of the housing.

7. The method of claim 6, further comprising the step of providing a plurality of selective couplers, each of the plurality of selective couplers having an engaged configuration and a disengaged configuration, the plurality of selective couplers including a first selective coupler and a second selective coupler, the first selective coupler in the engaged configuration being configured to connect one of the gearset components of the first planetary gearset with the housing.

8. The method of claim 7, wherein the second selective coupler in the engaged configuration being configured to connect one of the gearset components of the second planetary gearset with the housing.

* * * * *